(12) United States Patent
Wada et al.

(10) Patent No.: US 8,817,175 B2
(45) Date of Patent: Aug. 26, 2014

(54) DOME CAMERA AND HOUSING FOR DOME CAMERA

(75) Inventors: Jouji Wada, Kanagawa (JP); Kazushige Tamura, Kanagawa (JP)

(73) Assignee: Panasonic Corporation, Osaka (JP)

(*) Notice: Subject to any disclaimer, the term of this patent is extended or adjusted under 35 U.S.C. 154(b) by 1073 days.

(21) Appl. No.: 12/305,320

(22) PCT Filed: Jun. 15, 2007

(86) PCT No.: PCT/JP2007/062097
§ 371 (c)(1),
(2), (4) Date: Dec. 17, 2008

(87) PCT Pub. No.: WO2008/001624
PCT Pub. Date: Jan. 3, 2008

(65) Prior Publication Data
US 2009/0251538 A1   Oct. 8, 2009

(30) Foreign Application Priority Data
Jun. 27, 2006  (JP) .................................. 2006-176620

(51) Int. Cl.
H04N 5/225  (2006.01)
(52) U.S. Cl.
USPC ............................ 348/373; 348/374; 348/143
(58) Field of Classification Search
USPC ................... 348/143, 373, 374; 396/419, 427
See application file for complete search history.

(56) References Cited

U.S. PATENT DOCUMENTS

| | | | |
|---|---|---|---|
| 5,240,220 A | 8/1993 | Elberbaum | |
| 6,525,766 B1 * | 2/2003 | Ikoma et al. | 348/151 |
| 6,652,164 B2 * | 11/2003 | Stiepel et al. | 396/427 |
| 6,890,110 B2 * | 5/2005 | Kajino et al. | 396/427 |
| 7,101,095 B2 * | 9/2006 | Kajino et al. | 396/427 |
| 7,346,196 B2 * | 3/2008 | Gin | 382/118 |
| 7,586,537 B2 * | 9/2009 | Konishi et al. | 348/373 |
| D603,441 S * | 11/2009 | Wada et al. | D16/203 |

(Continued)

FOREIGN PATENT DOCUMENTS

| | | |
|---|---|---|
| JP | 2001-346074 | 12/2001 |
| JP | 2004-048111 | 2/2004 |
| JP | 2004-356668 | 12/2004 |
| JP | 2006-041919 | 2/2006 |

OTHER PUBLICATIONS

Translation of Japanese Publication No. 2004-35668, Dec. 16, 2004, Nakahira.*

(Continued)

Primary Examiner — Jimmy H Tran
(74) Attorney, Agent, or Firm — Pearne & Gordon LLP

(57) ABSTRACT

A dome camera (1A) includes a camera (2), a base (4A), and a dome cover (5). The base (4A) has a reference surface (P1) and a cover-support surface (P2) tilted relative to the reference surface (P1). A semispherical cover (9) having a semispherical shape and a partial spherical cover (10) having a partial spherical shape are joined together at a joint surface (P3). A cover-supported surface (P4) of the partial spherical cover (10) is supported on the cover-support surface (P2) of the base. The camera (2) is placed so that the optical axis (X1) thereof passes through the spherical center (C). The dome cover (5) is supported so as to be rotatable on the cover-support surface (P2) around a rotational axis (X2) passing through the spherical center (C). Thereby, the direction of the visual range of the camera can be adjusted.

10 Claims, 7 Drawing Sheets

(56) References Cited

U.S. PATENT DOCUMENTS

| | | | |
|---|---|---|---|
| 7,616,229 B2 * | 11/2009 | Wada et al. | 348/151 |
| 7,841,782 B2 * | 11/2010 | Tatewaki | 396/427 |
| 7,990,468 B2 * | 8/2011 | Yamamoto | 348/373 |
| 8,317,414 B2 * | 11/2012 | Jones | 396/427 |
| 2001/0047743 A1 | 12/2001 | Raad et al. | |
| 2004/0032492 A1 * | 2/2004 | Wada et al. | 348/143 |
| 2004/0037552 A1 * | 2/2004 | Kajino et al. | 396/427 |
| 2005/0175335 A1 * | 8/2005 | Kajino et al. | 396/427 |
| 2006/0017842 A1 * | 1/2006 | Jun | 348/373 |
| 2008/0231699 A1 * | 9/2008 | Konishi et al. | 348/143 |

OTHER PUBLICATIONS

European Search Report for Application No. EP 07745352.0 dated Jun. 7, 2011.
International Search Report.

* cited by examiner

DOME CAMERA AND HOUSING FOR DOME CAMERA

TECHNICAL FIELD

The present invention relates to a dome camera having a dome cover for covering a camera and, more particularly, to a dome camera capable of adjusting the direction of the visual range of the camera.

BACKGROUND OF ART

A dome camera, which is used, for example, for surveying a facility, is installed on a ceiling or the like. Conventionally, as a dome camera of this type, a dome camera having a base attached to the ceiling or the like, a camera attached to the base, and a transparent dome cover for covering the camera has been known. For example, Japanese Patent Laid-Open No. 2004-356668 (pp. 6-9, FIG. 1) discloses a dome camera of this type. Such a conventional dome camera uses a semispherical dome cover because such a dome cover can be molded easily and be manufactured at a low cost.

For the conventional dome camera, the dome cover is fixed to the base, so that the direction of the dome cover cannot be adjusted. Therefore, even when a camera having a pan and tilt mechanism rotatable in all directions of 360 degrees is used, the visual range (the range in which pictures can be taken) of the camera is limited to a semispherical range with the vertex direction of dome cover being the center (a semispherical range from the vertex direction to the equator direction of dome cover).

For the dome camera, the direction of the visual range (the center direction of visual range) of camera must be adjusted in some cases according to conditions such as an installation place. For example, in the case of a dome camera installed on a ceiling, the usual visual range of camera is a predetermined range from the downward vertical direction (the vertex direction of dome cover) to the horizontal direction (the equator direction of dome cover). In some cases, a range from the horizontal direction up to an upward angle is desired to be included in the visual range depending on the installation place of dome camera. However, for the conventional dome camera, the direction of the visual range has been unable to be adjusted.

DISCLOSURE OF THE INVENTION

The present invention has been made with the above-described background, and accordingly an object thereof is to provide a dome camera capable of adjusting the direction of the visual range of a camera.

One aspect of the present invention is a dome camera including a base, a camera provided on the base, and a dome cover supported on the base to cover the camera, wherein the base has a predetermined reference surface and a cover-support surface tilted relative to the reference surface; the dome cover is constructed by joining a semispherical cover and a partial spherical cover, which have the same spherical center, together at a joint surface passing through the spherical center; the semispherical cover has a semispherical shape obtained by cutting a sphere at the joint surface; the partial spherical cover has a partial spherical shape obtained by cutting a sphere at the joint surface and at a cover-supported surface tilted relative to the joint surface; the cover-supported surface of the partial spherical cover is supported on the cover-support surface of the base; the camera is placed so that the optical axis thereof passes through the spherical center; and the dome cover is supported so as to be rotatable on the cover-support surface around a rotational axis passing through the spherical center.

Another aspect of the present invention is a housing for a dome camera, including a base and a dome cover supported on the base, wherein the base has a predetermined reference surface and a cover-support surface tilted relative to the reference surface; the dome cover is constructed by joining a semispherical cover and a partial spherical cover, which have the same spherical center, together at a joint surface passing through the spherical center; the semispherical cover has a semispherical shape obtained by cutting a sphere at the joint surface; the partial spherical cover has a partial spherical shape obtained by cutting a sphere at the joint surface and at a cover-supported surface tilted relative to the joint surface; the cover-supported surface of the partial spherical cover is supported on the cover-support surface of the base; and the dome cover is supported so as to be rotatable on the cover-support surface around a rotational axis passing through the spherical center.

As explained below, the present invention can adopt other aspects. Therefore, the disclosure of the present invention intends the provision of some aspects of the present invention, and does not intend the restriction of the scope of invention described and claimed herein.

Figure 1:
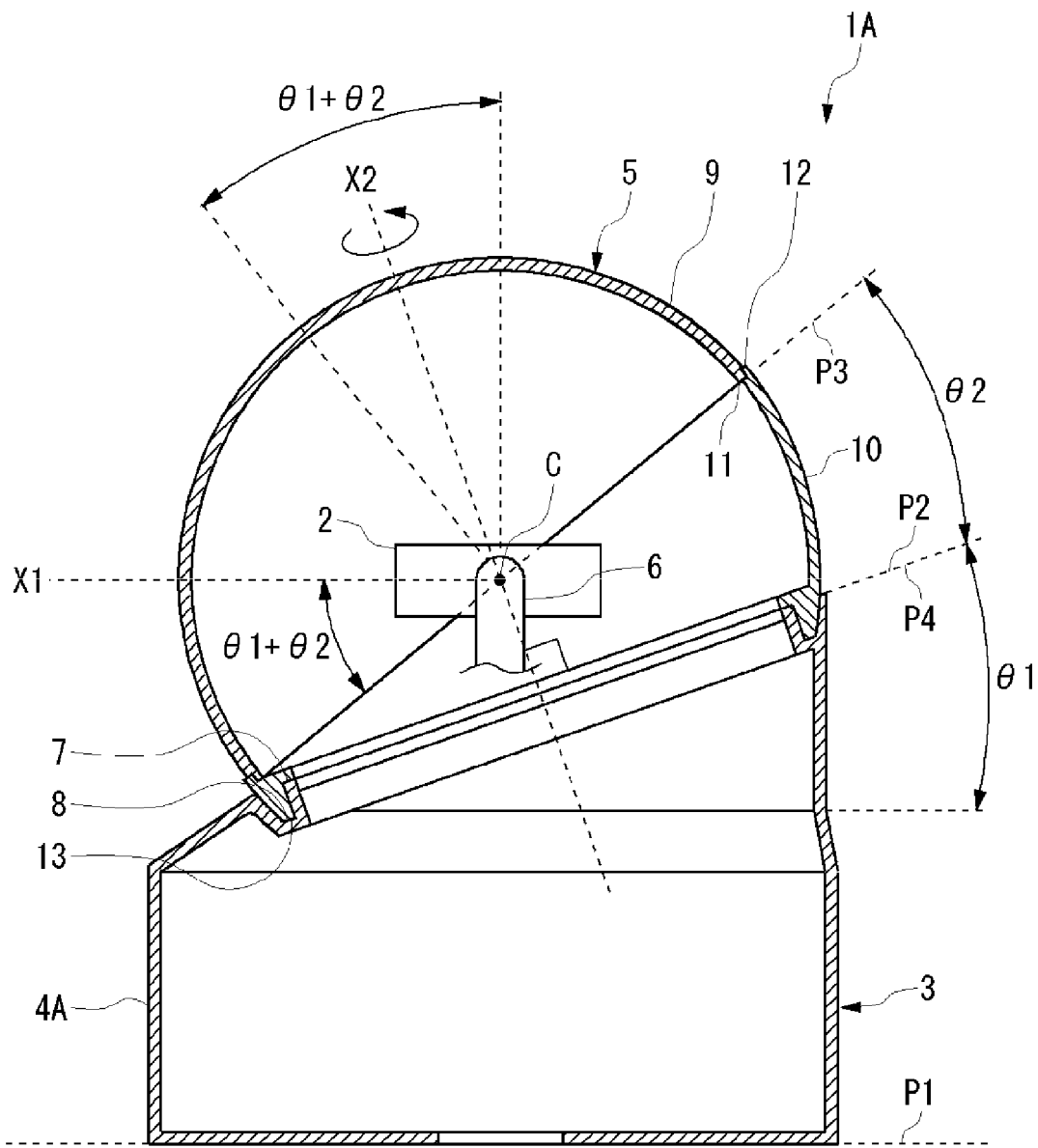
FIG. 1 is a sectional view of a dome camera in accordance with a first embodiment of the present invention.

DESCRIPTION OF SYMBOLS 1A, 1B . . . dome camera
2 . . . camera
3 . . . housing
4A, 4B . . . base
5 . . . dome cover
6 . . . pan and tilt mechanism
9 . . . semispherical cover
10 . . . partial spherical cover
14 . . . fixed part
15 . . . rotatable part
P1 . . . reference surface
P2 . . . cover-support surface
P3 . . . joint surface
P4 . . . cover-supported surface
C . . . spherical center
X1 . . . optical axis
X2 . . . rotational axis
θ1 . . . tilt angle of cover-support surface with respect to reference surface
θ2 . . . tilt angle of joint surface with respect to cover-supported surface

BEST MODE FOR CARRYING OUT THE INVENTION

The present invention will now be described in detail. The following detailed description and the accompanying drawings do not restrict the invention. Instead, the scope of invention is specified by the appended claims.

A dome camera in accordance with the present invention has a base, a camera provided on the base, and a dome cover supported on the base to cover the camera. The base has a predetermined reference surface and a cover-support surface tilted relative to the reference surface. The dome cover is constructed by joining a semispherical cover and a partial spherical cover, which have the same spherical center, together at a joint surface passing through the spherical center. The semispherical cover has a semispherical shape obtained by cutting a sphere at the joint surface, and the partial spherical cover has a partial spherical shape obtained by cutting a sphere at the joint surface and at a cover-supported surface tilted relative to the joint surface. The cover-supported surface of the partial spherical cover is supported on the cover-support surface of the base. The camera is placed so that the optical axis thereof passes through the spherical center, and the dome cover is supported so as to be rotatable on the cover-support surface around a rotational axis passing through the spherical center.

By this configuration, the dome cover is rotated on the cover-support surface of the base, by which the vertex direction of the semispherical cover can be tilted. In this case, by rotating the dome cover on the cover-support surface of the base, the tilt of the vertex direction of semispherical cover can be adjusted within a range from the minimum tilt angle (the difference between the tilt angle of the cover-support surface with respect to the reference surface and the tilt angle of the cover-supported surface with respect to the joint surface) to the maximum tilt angle (the sum of the tilt angle of the cover-support surface with respect to the reference surface and the tilt angle of the cover-supported surface with respect to the joint surface). Thereby, the direction of the visual range of camera (the vertex direction of semispherical cover) can be adjusted according to conditions such as the installation place of the dome camera.

Also, for the dome camera in accordance with the present invention, the base may be provided with a turning mechanism for turning the camera and a cover rotating mechanism for rotating the dome cover independently of the turning of the camera.

By this configuration, when an external force is applied to the dome cover, the dome cover is rotated relative to the base, so that the camera rotating mechanism can be prevented from being subject to the load of external force. Thereby, the camera rotating mechanism can be protected from the load of external force.

Also, for the dome camera in accordance with the present invention, the tilt angle of the cover-support surface with respect to the reference surface and the tilt angle of the cover-supported surface with respect to the joint surface may be set so as to be equal to each other.

By this configuration, the minimum tilt angle (the difference between the tilt angle of the cover-support surface with respect to the reference surface and the tilt angle of the cover-supported surface with respect to the joint surface) of the tilt of the vertex direction of the semispherical cover is set at 0 degree. Thereby, the direction of the visual range of camera (the vertex direction of semispherical cover) can be set in the direction perpendicular to the reference surface of the base. For example, in the case where the dome camera is installed on a ceiling, the direction of the visual range of camera can be set so as to be the downward vertical direction (that is, the visual range of camera is from the downward vertical direction to the horizontal direction).

Also, for the dome camera in accordance with the present invention, the base may have a fixed part having the reference surface and a rotatable part having the cover-support surface and being rotatable with respect to the fixed part, and wherein the dome cover may be rotatably supported on the rotatable part.

By this configuration, the rotatable part of the base is rotated relative to the fixed part thereof, by which the direction of the vertex direction of semispherical cover can be changed. In this case, the tilt of the vertex direction of semispherical cover is unchanged. If the tilt of the vertex direction of semispherical cover is adjusted by rotating the dome cover on the cover-support surface of the base, the direction of the vertex direction of semispherical cover is also changed. In such a case, by rotating the rotatable part of the base relative to the fixed part thereof, the direction of the vertex direction of semispherical cover (the direction of the visual range of camera) can be adjusted to a desired direction.

A housing of the dome camera in accordance with the present invention includes the base and the dome cover supported on the base. The base has the predetermined reference surface and the cover-support surface tilted relative to the reference surface, and the dome cover is constructed by joining the semispherical cover and the partial spherical cover, which have the same spherical center, together at the joint surface passing through the spherical center. The semispherical cover has a semispherical shape obtained by cutting a sphere at the joint surface, and the partial spherical cover has a partial spherical shape obtained by cutting a sphere at the joint surface and at the cover-supported surface tilted relative to the joint surface. The cover-supported surface of the partial spherical cover is supported on the cover-support surface of the base, and the dome cover is supported so as to be rotatable on the cover-support surface around the rotational axis passing through the spherical center.

By this configuration as well, as described above, the direction of the visual range of camera (the vertex direction of semispherical cover) can be adjusted according to conditions such as the installation place of the dome camera.

Also, for the housing of a dome camera in accordance with the present invention, the base may be provided with the cover rotating mechanism for rotating the dome cover independently of the turning of the camera.

By this configuration as well, as described above, the camera rotating mechanism can be protected from the load of external force.

Also, for the housing of a dome camera in accordance with the present invention, the tilt angle of the cover-support surface with respect to the reference surface and the tilt angle of the cover-supported surface with respect to the joint surface may be set so as to be equal to each other.

By this configuration as well, as described above, the vertex direction of semispherical cover can be set in the direction perpendicular to the reference surface of the base.

Also, for the housing of a dome camera in accordance with the present invention, the base may have the fixed part having the reference surface and the rotatable part having the cover-support surface and being rotatable with respect to the fixed part, and wherein the dome cover may be rotatably supported on the rotatable part.

By this configuration as well, as described above, in the case where the tilt of the vertex direction of semispherical cover is adjusted, when the direction of the vertex direction of semispherical cover is also changed, the direction of the vertex direction of semispherical cover can be adjusted to a desired direction.

In the present invention, the dome cover, which is formed by the base having the reference surface and the cover-support surface, the semispherical cover, and the partial spherical cover, is provided, and the dome cover is supported so as to be rotatable on the cover-support surface, by which the direction of the visual range of camera can be adjusted.

Hereunder, the dome cameras in accordance with embodiments of the present invention are explained with reference to the drawings. In these embodiments, dome cameras used as surveillance cameras or the like installed in facilities are shown as examples. The dome camera of each of these embodiments is installed, for example, on a camera mount provided at a predetermined location in a facility. Alternatively, the dome camera of each of these embodiments is installed on a wall, a ceiling, or the like of the facility.

First Embodiment

Figure 2:
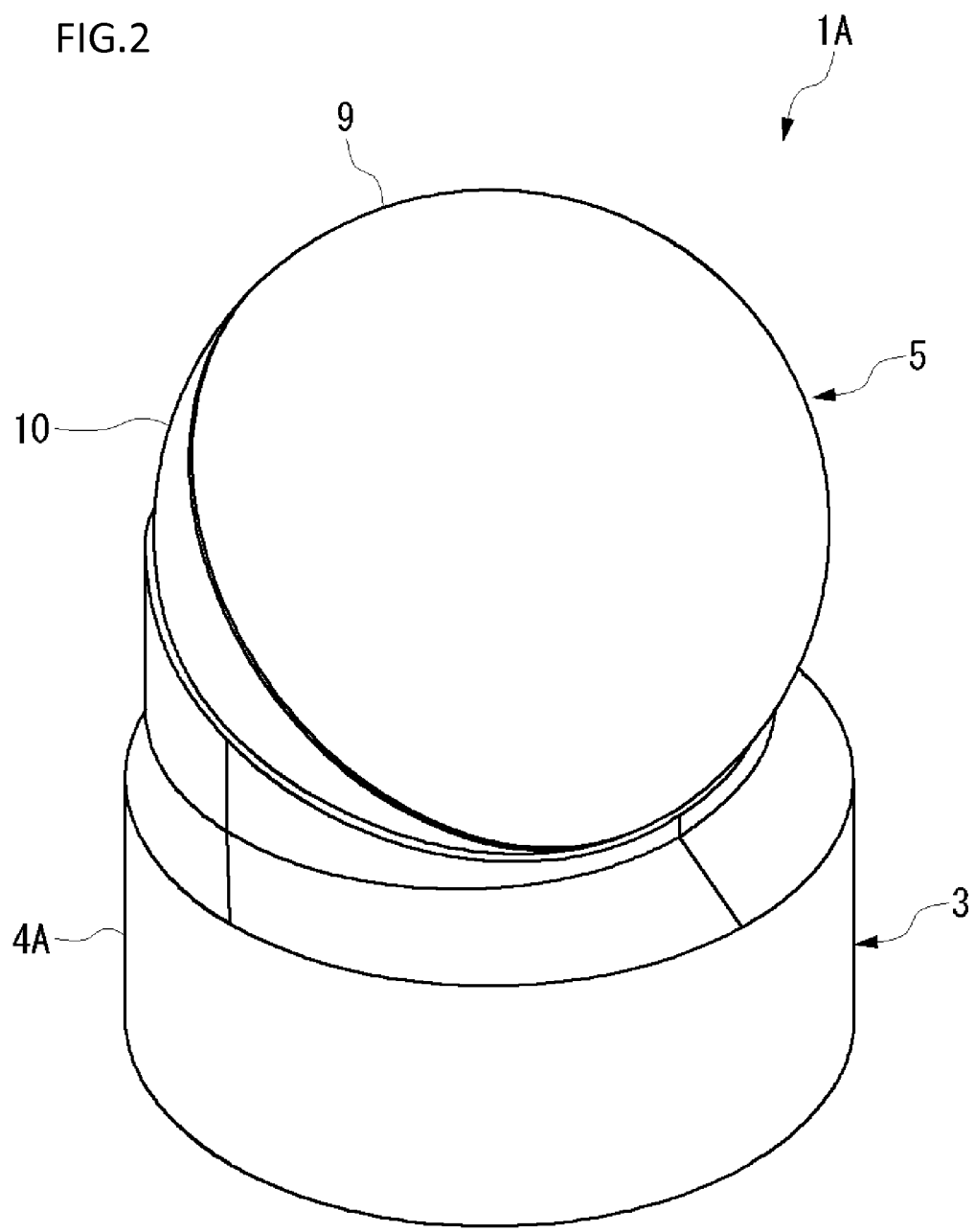
FIG. 2 is a perspective view of a dome camera in accordance with a first embodiment of the present invention.
Figure 3:
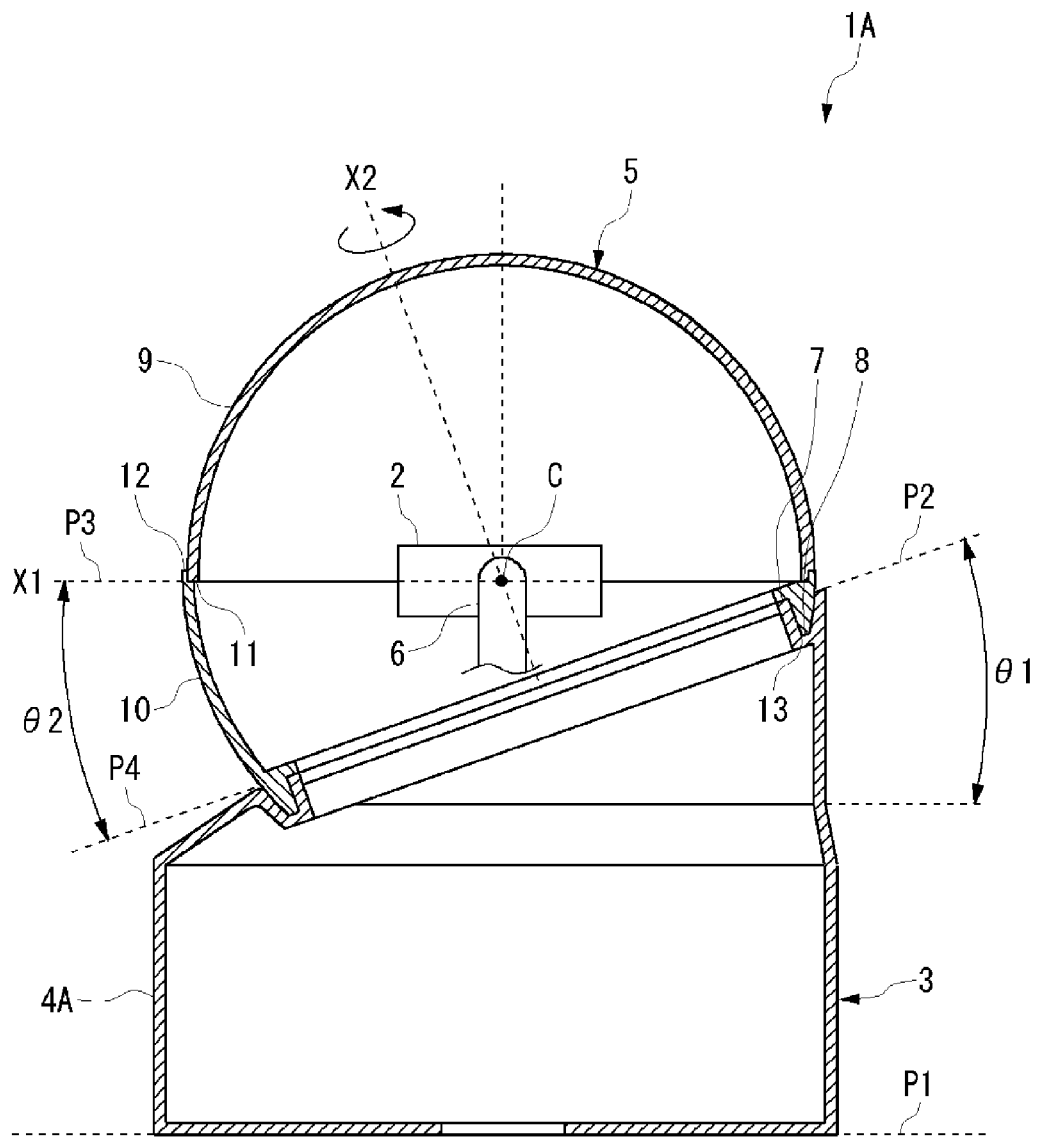
FIG. 3 is a sectional view of a dome camera in accordance with a first embodiment of the present invention.

A dome camera in accordance with a first embodiment of the present invention is shown in FIGS. 1 to 3. FIGS. 1 and 3 are sectional views of the dome camera 1A of this embodiment. FIG. 2 is a perspective view of the dome camera 1A of this embodiment. As shown in FIGS. 1 to 3, a camera 2 of the dome camera 1A is housed in a housing 3. The housing 3 is formed by a base 4A mounted on a mounting surface such as a ceiling and a dome cover 5 mounted rotatably on the base 4A.

The base 4A is provided with a pan and tilt mechanism 6 for the camera 2. By this pan and tilt mechanism 6, the camera 2 can be turned in the pan direction and the tilt direction with respect to the base 4A. The pan and tilt mechanism 6 corresponds to a turning mechanism of the present invention.

On the lower surface (the downside surface in FIG. 1) of the base 4A, a reference surface P1, which is used as a reference when the base 4A is mounted on a ceiling or the like, is provided. On the upper surface (the upside surface in FIG. 1) of the base 4A, a cover-support surface P2 tilted through an angle θ1 relative to the reference surface P1 is provided. On the cover-support surface P2 of the base 4A, a ring-shaped projecting part 7 is formed. Around the ring-shaped projecting part 7, a ring-shaped engagement groove 8 is formed. In this embodiment, the cover-support surface P2 is tilted relative to the reference surface P1 so that the front side (the left-hand side in FIG. 1) of the dome camera 1A is low.

The dome cover 5 includes a semispherical cover 9 and a partial spherical cover 10, which have the same spherical center C. The semispherical cover 9 has a semispherical shape obtained by cutting a sphere at an equator surface P3, and the partial spherical cover 10 has a partial spherical shape obtained by cutting a sphere at the equator surface P3 and a cover-supported surface P4 tilted through an angle θ2 relative to the equator surface P3. The equator surface P3 of the semispherical cover 9 and the equator surface P3 of the partial spherical cover 10 are joined to each other. That is to say, the equator surface P3 of the semispherical cover 9 and the equator surface P3 of the partial spherical cover 10 can be said to be a joint surface P3 between the semispherical cover 9 and the partial spherical cover 10. This joint surface P3 is a plane passing through the spherical center C of the semispherical cover 9 and the partial spherical cover 10.

In the end part of the equator surface P3 of the semispherical cover 9 (the joint surface P3 on the semispherical cover 9), a joint convex part 11 projecting on the inside (the inner surface side of the sphere) is formed in a ring shape. In the end part of the equator surface P3 of the partial spherical cover 10 (the joint surface P3 on the partial spherical cover 10), a joint convex part 12 projecting on the outside (the outer surface side of the sphere) is formed in a ring shape. By fitting the joint convex part 11 of the semispherical cover 9 and the joint convex part 12 of the partial spherical cover 10 to each other, the semispherical cover 9 and the partial spherical cover 10 are joined to each other.

On the cover-supported surface P4 of the partial spherical cover 10, a projecting ring-shaped engagement part 13 is formed. The engagement part 13 of the partial spherical cover 10 engages with the engagement groove 8 of the base 4A so that the partial spherical cover 10 can be rotated relative to the base 4A. By this rotating mechanism, the dome cover 5 is supported so as to be rotatal on the cover-support surface P2 of the base 4A. The dome cover 5 can be rotated relative to the base 4A independently of the turning in the pan direction and the tilt direction of the camera 2. Specifically, when the dome cover 5 is rotated, only the dome cover 5 is rotated relative to the base 4A. For example, even if the dome cover 5 is rotated by the application of an external force, the pan and tilt mechanism 6 of the camera 2 does not subject to the external force. The above-described rotating mechanism corresponds to a cover rotating mechanism of the present invention.

In this embodiment, the semispherical cover 9 is made of a transparent plastic, and the partial spherical cover 10 is made of a nontransparent plastic. The semispherical cover 9 and the partial spherical cover 10 are manufactured by molding. Thereby, the semispherical cover 9 and the partial spherical cover 10 can be manufactured at a low cost.

Also, in this embodiment, the tilt angle θ1 of the cover-support surface P2 with respect to the reference surface P1 and the tilt angle θ2 of the joint surface P3 with respect to the cover-supported surface P4 are set so as to be equal to each other (θ1=θ2).

The camera 2 is covered with the above-described dome cover 5. The camera 2 is provided with an image pickup device such as a CCD, and is placed at a position such that an optical axis X1 of light incident on the image pickup device passes through the spherical center C. Therefore, the visual range of the camera 2 is a semispherical range with the vertex direction of the semispherical cover 9 being the center (a semispherical range from the vertex direction of the semispherical cover 9 to the equator direction).

The operation of the dome camera 1A configured as described above is explained. Hereunder, explanation is given of an operation for adjusting the visual range of the camera 2 according to conditions such as an installation place at the time when the dome camera 1A is installed.

In the dome camera 1A in accordance with the first embodiment of the present invention, when the visual range of the camera 2 is adjusted, the dome cover 5 is rotated relative to the base 4A. When the dome cover 5 is rotated, the position of the semispherical cover 9 on the cover-support surface P2 (the position of the vertex of the semispherical cover 9) changes.

As shown in FIG. 1, for example, when the dome cover 5 is rotated so that the position of the semispherical cover 9 on the cover-support surface P2 comes to the front side (left-hand side in FIG. 1) of the dome camera 1A, the vertex direction of the semispherical cover 9 is at the maximum tilt angle (θ1+θ2).

On the other hand, as shown in FIG. 3, when the dome cover 5 is rotated so that the position of the semispherical cover 9 on the cover-support surface P2 comes to the back side (right-hand side in FIG. 3) of the dome camera 1A, the vertex direction of the semispherical cover 9 is at the minimum tilt angle (θ1−θ2).

In this embodiment, the tilt angle θ1 of the cover-support surface P2 with respect to the reference surface P1 and the tilt angle θ2 of the joint surface P3 with respect to the cover-supported surface P4 are set so as to be equal to each other (θ1=θ2). Therefore, the minimum tilt angle of the tilt of the vertex direction of the semispherical cover 9 is 0 degree. That is to say, in this case, the equator surface P3 of the semispherical cover 9 is horizontal with respect to the reference surface P1 (refer to FIG. 3).

Thus, the tilt of the vertex direction of the semispherical cover 9 is adjusted by rotating the dome cover 5 on the cover-support surface P2. Thereby, the visual range of the camera 2 can be adjusted. Herein, the tilt of the vertex direction of the semispherical cover 9 means the tilt angle of the vertex direction of the semispherical cover 9 from the direction perpendicular to the reference surface P1 (or the tilt angle of the equator direction of the semispherical cover 9 from the horizontal direction with respect to the reference surface P1).

According to the dome camera 1A of the first embodiment of the present invention, the dome cover 5 formed by the semispherical cover 9 and the partial spherical cover 10 is provided, and the dome cover 5 is supported so as to be rotatable on the cover-support surface P2, by which the direction of the visual range of the camera 2 can be adjusted.

That is to say, in this embodiment, the vertex direction of the semispherical cover 9 can be tilted by rotating the dome cover 5 on the cover-support surface P2. In this case, by rotating the dome cover 5 on the cover-support surface P2 of the base 4A, the tilt of the vertex direction of the semispherical cover 9 can be adjusted within the range from the minimum tilt angle (θ1−θ2) to the maximum tilt angle (θ1+θ2). Thereby, the direction of the visual range of the camera 2 (the vertex direction of the semispherical cover 9) can be adjusted according to conditions such as the installation place of the dome camera 1A.

Also, in this embodiment, since the cover rotating mechanism is independent of the pan and tilt turning of the camera 2, when an external force is applied to the dome cover 5, only the dome cover 5 is rotated relative to the base 4A, so that the pan and tilt mechanism 6 of the camera 2 can be prevented from being subject to the load of external force. Thereby, the pan and tilt mechanism 6 of the camera 2 can be protected from the load of external force.

Also, in this embodiment, since the minimum tilt angle (θ1−θ2) of the tilt of vertex direction of the semispherical cover 9 is 0 degree, the direction of the visual range of the camera 2 (the vertex direction of the semispherical cover 9) can be set in the direction perpendicular to the reference surface P1 of the base 4A. For example, in the case where the dome camera 1A is installed on a ceiling, the direction of the visual range of the camera 2 can be set so as to be the downward vertical direction (that is, the visual range of the camera 2 is from the downward vertical direction to the horizontal direction).

Also, in this embodiment, the optical axis X1 of the camera 2 is arranged so as to pass through the spherical center C, and the dome cover 5 is rotated on the cover-support surface P2 around a rotational axis X2 passing through the spherical center C. The rotational axis X2 is perpendicular to the cover-support surface P2 (and the cover-supported surface P4). Thereby, when the dome cover 5 is rotated, the optical axis X1 of the camera 2 is always positioned at the spherical center C of the dome cover 5. That is to say, even if the position of the semispherical cover 9 on the cover-support surface P2 changes, the optical axis X1 of the camera 2 is always positioned at the spherical center C of the semispherical cover 9. Therefore, aberration and distortion caused by the rotating of the dome cover 5 can be prevented from occurring.

Second Embodiment

Next, a dome camera 1B in accordance with a second embodiment of the present invention is shown in FIGS. 4 to 7. The dome camera 1B of this embodiment is configured by adding a base rotating mechanism to the dome camera 1A of the first embodiment. That is to say, unless otherwise specified, the configuration of the dome camera 1B of this embodiment is the same as the configuration of the first embodiment.

Figure 4:
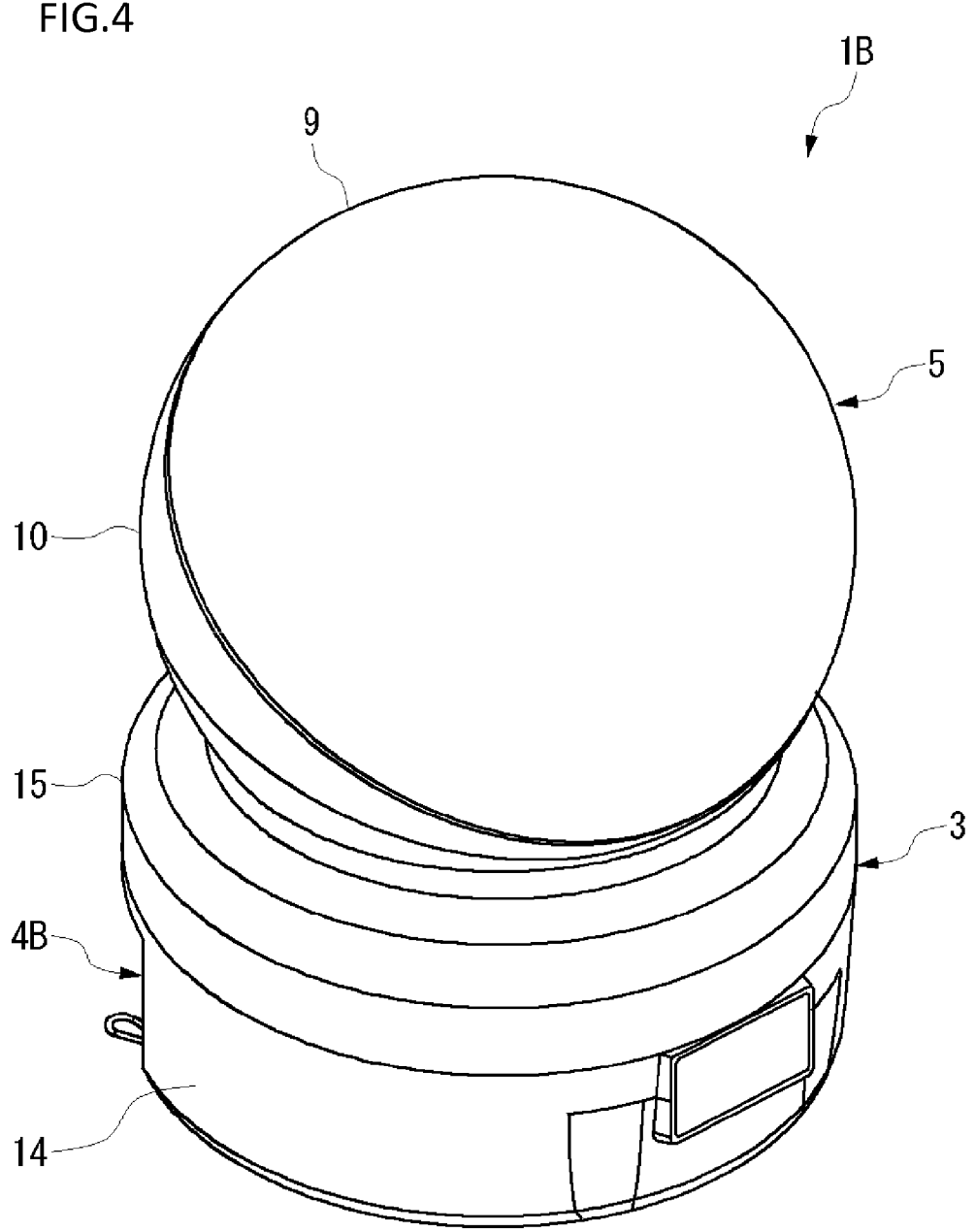
FIG. 4 is a perspective view of a dome camera in accordance with a second embodiment of the present invention.
Figure 5:
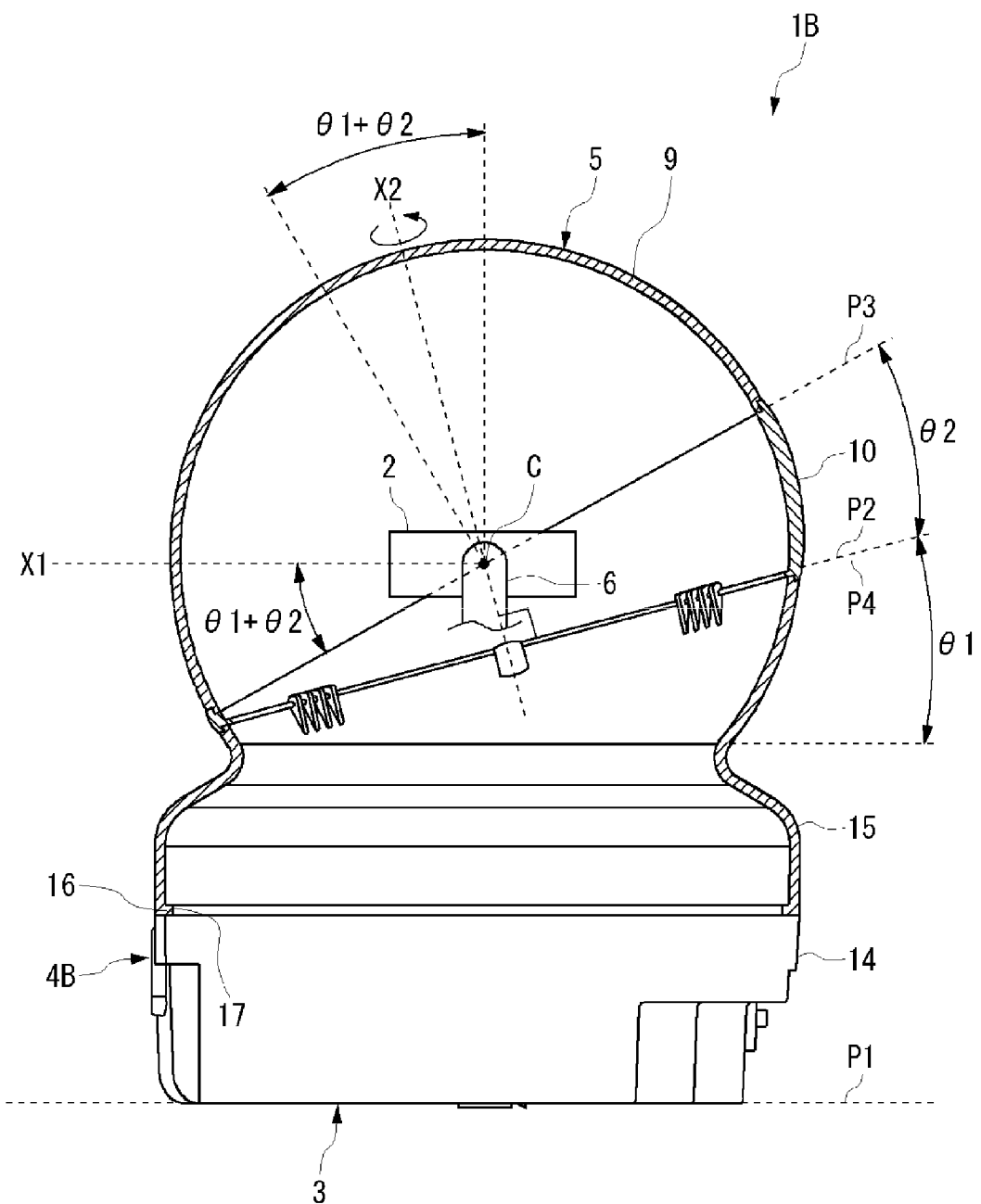
FIG. 5 is a sectional view of a dome camera in accordance with a second embodiment of the present invention.
Figure 6:
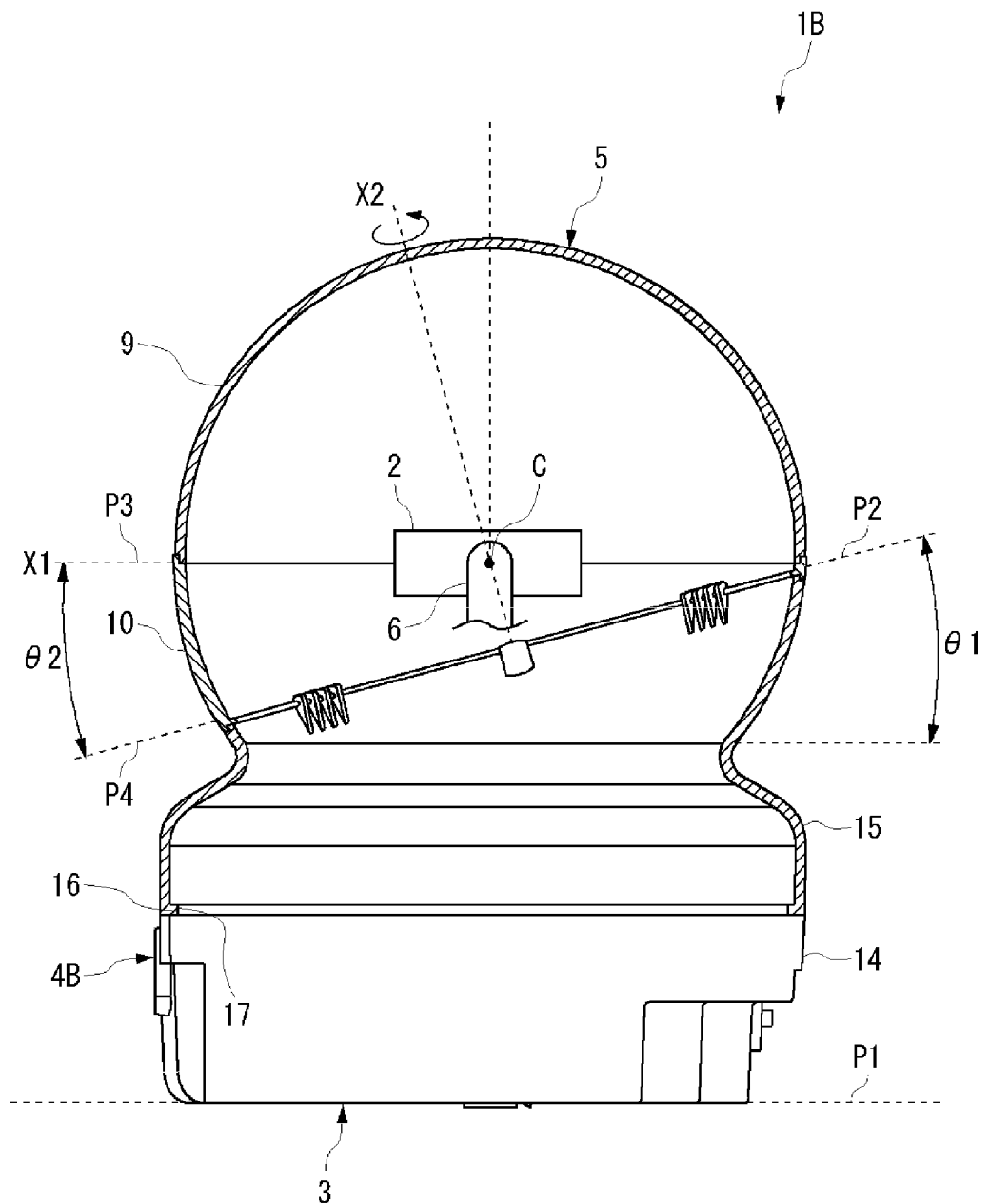
FIG. 6 is a sectional view of a dome camera in accordance with a second embodiment of the present invention.

FIG. 4 is a perspective view of the dome camera 1B of this embodiment, and FIGS. 5 and 6 are sectional views of the dome camera 1B of this embodiment. As shown in FIGS. 4 to 6, a base 4B of the dome camera 1B of this embodiment includes a fixed part 14 having the reference surface P1 on the lower surface and a rotatable part 15 having the cover-support surface P2 on the upper surface.

As shown in FIGS. 5 and 6, in the outer peripheral surface of the fixed part 14 of the base 4B, a locking groove 16 is provided circumferentially. In the lower end part of the rotatable part 15 of the base 4B, a locking part 17 is provided so as to project toward the inside. The locking part 17 of the rotatable part 15 of the base 4B engages with the locking groove 16 of the fixed part 14, by which the rotatable part 15 of the base 4B is rotatably supported on the fixed part 14. The base 4B of this embodiment has the above-described base rotating mechanism.

The operation of the dome camera 1B in accordance with the second embodiment of the present invention, which is configured as described above, is explained. Hereunder, the rotating of the base 4B, which is a characteristic operation of the dome camera 1B of this embodiment, is explained with reference to FIG. 7 (FIGS. 7A and 7B).

For the dome camera 1B in accordance with the second embodiment of the present invention, when the visual range of the camera 2 is adjusted, as in the first embodiment, the tilt of the vertex direction of the semispherical cover 9 is adjusted by rotating the dome cover 5 relative to the base 4B.

Figure 7A:
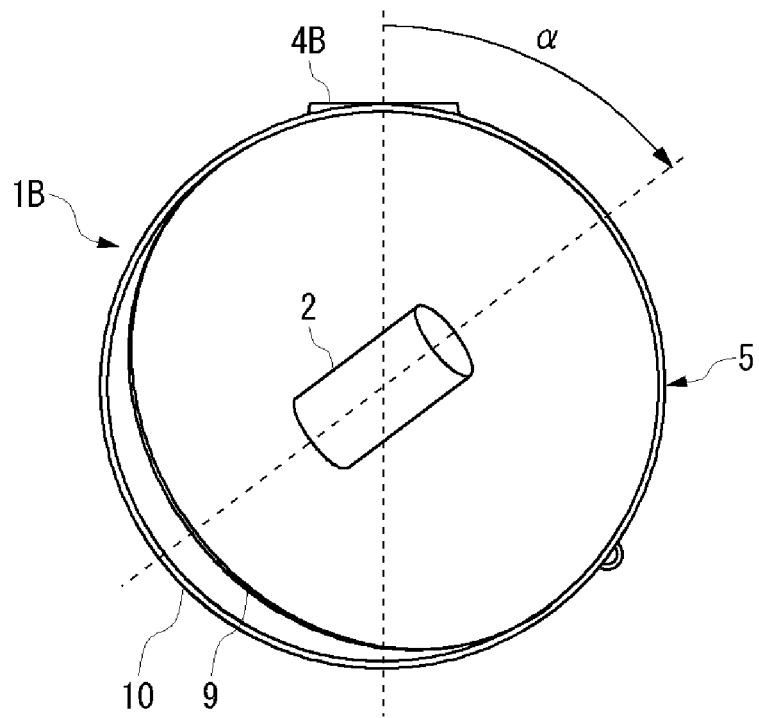
FIG. 7A is a plan view of a dome camera in accordance with a second embodiment of the present invention.

For example, when the tilt of the vertex direction of the semispherical cover 9 is adjusted by rotating the dome cover 5 through an angle α relative to the base 4B as shown in FIG. 7A, the direction of the vertex direction of the semispherical cover 9 shifts through the angle α from the front side of the dome camera 1B (upside in FIG. 7A).

Figure 7B:
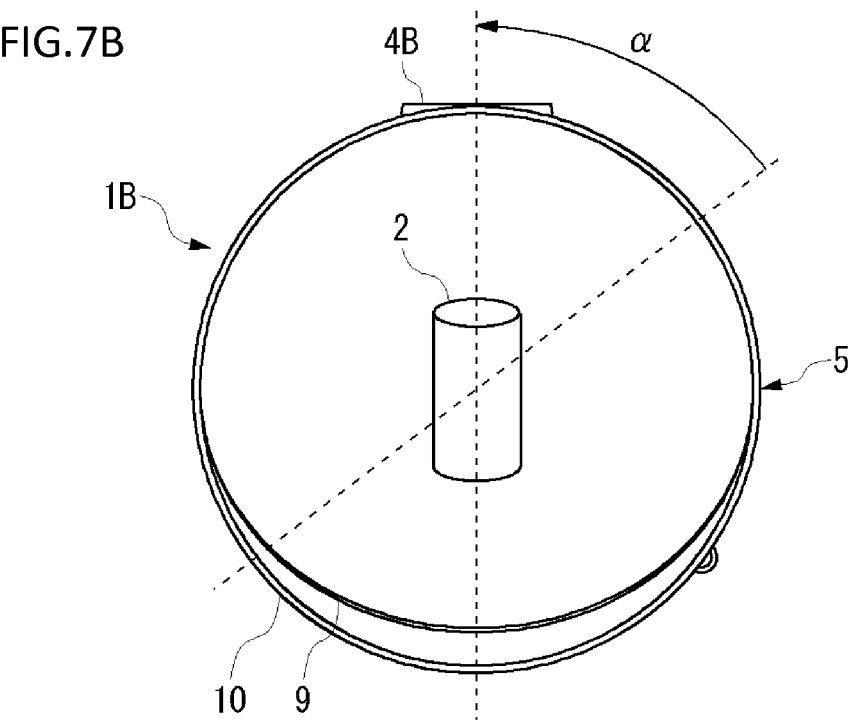
FIG. 7B is a plan view of a dome camera in accordance with a second embodiment of the present invention.

In such a case, in this embodiment, as shown in FIG. 7B, by reversely rotating the rotatable part 15 of the base 4B through the same angle α relative to the fixed part 14, the direction of the vertex direction of the semispherical cover 9 can be directed to the front side of the dome camera 1B (upside in FIG. 7A).

The above-described dome camera 1B in accordance with the second embodiment of the present invention also achieves the same operation and effect as those of the first embodiment.

Also, in this embodiment, the direction of the vertex direction of the semispherical cover 9 can be changed by rotating the rotatable part 15 of the base 4B relative to the fixed part 14. In this case, the tilt of the vertex direction of the semispherical cover 9 is unchanged. Therefore, if the tilt of the vertex direction of the semispherical cover 9 is adjusted by rotating the dome cover 5 on the cover-support surface P2 of the base 4B, even when the direction of the vertex direction of the semispherical cover 9 is also changed, the direction of the vertex direction of the semispherical cover 9 (the direction of the visual range of the camera 2) can be adjusted to a desired direction by rotating the rotatable part 15 of the base 4B relative to the fixed part 14.

The above is an explanation of the embodiments of the present invention given by taking examples. The scope of the present invention is not limited to these embodiments. Changes and modifications can be made according to the object within the scope described in claims.

For example, the explanation has been given of the case where the tilt angle θ1 of the cover-support surface P2 with respect to the reference surface P1 and the tilt angle θ2 of the joint surface P3 with respect to the cover-supported surface P4 are set so as to be equal to each other (θ1=θ2). However, the scope of the present invention is not limited to this configuration. The tilt angle θ1 of the cover-support surface P2 with respect to the reference surface P1 and the tilt angle θ2 of the joint surface P3 with respect to the cover-supported surface P4 may be set so as to be different from each other (θ1≠θ2).

When the dome cover 5 is rotated relative to the base 4A, 4B, the dome cover 5 may be rotated by a driving force of a motor or the like, or may be rotated manually. Also, when the rotatable part 15 of the base 4B is rotated relative to the fixed part 14, the rotatable part 15 of the base 4B may be rotated by a driving force of a motor or the like, or may be rotated manually.

The above is an explanation of preferred embodiments of the present invention that can be thought of at the present time. However, it is understood that the embodiments can be modified variously, and it is intended that all of such modifications within the true spirit and scope of the present invention are embraced in the appended claims.

INDUSTRIAL APPLICABILITY

As described above, the dome camera in accordance with the present invention achieves an effect that the direction of the visual range of camera is adjustable, and is useful as a dome camera used as a surveillance camera or the like camera.

The invention claimed is:

1. A dome camera comprising a base, a camera provided on the base, and a dome cover supported on the base to cover the camera, wherein
   the base has a predetermined reference surface at which the base is mounted on an object and a cover-support surface tilted relative to the reference surface;
   the dome cover comprises a semispherical cover and a partial spherical cover, wherein the semispherical cover and the partial spherical cover have the same spherical center and are joined together at a joint surface passing through the spherical center and tilted relative to both the cover-support surface and the reference surface;
   the semispherical cover has a semispherical shape obtained by cutting a sphere at the joint surface;
   the partial spherical cover has a partial spherical shape obtained by cutting a sphere at the joint surface and at a cover-supported surface tilted relative to the joint surface;
   the cover-supported surface of the partial spherical cover is supported on the cover-support surface of the base;
   the dome cover is supported so as to be rotatable on the cover-support surface around a rotational axis passing through the spherical center; and
   the cover-support surface changes an angle of the joint surface to the reference surface when the partial spherical cover is rotated on the cover-support surface.

2. The dome camera according to claim 1, wherein the base comprises:
   a turning mechanism for turning the camera; and
   a cover rotating mechanism for rotating the partial spherical cover independently of the turning of the camera.

3. The dome camera according to claim 2, wherein the cover rotating mechanism rotates the dome cover independently of the turning of the camera.

4. The dome camera according to claim 1, wherein the tilt angle of the cover-support surface with respect to the reference surface and the tilt angle of the cover-supported surface with respect to the joint surface are set so as to be equal to each other.

5. The dome camera according to claim 1, wherein the base comprises:
   a fixed part having the reference surface; and
   a rotatable part having the cover-support surface and being rotatable with respect to the fixed part, and wherein the dome cover is rotatably supported on the rotatable part.

6. The dome camera according to claim 1, wherein an angle of the cover-support surface to the reference surface is fixed.

7. A housing for a dome camera, comprising a base and a dome cover supported on the base, wherein
   the base has a predetermined reference surface at which the base is mounted on an object and a cover-support surface tilted relative to the reference surface;
   the dome cover comprises a semispherical cover and a partial spherical cover, wherein the semispherical cover and the partial spherical cover have the same spherical center and are joined together at a joint surface passing through the spherical center and tilted relative to both the cover-support surface and the reference surface;
   the semispherical cover has a semispherical shape obtained by cutting a sphere at the joint surface;
   the partial spherical cover has a partial spherical shape obtained by cutting a sphere at the joint surface and at a cover-supported surface tilted relative to the joint surface;
   the cover-supported surface of the partial spherical cover is supported on the cover-support surface of the base; and
   the dome cover is supported so as to be rotatable on the cover-support surface around a rotational axis passing through the spherical center; and
   the cover-support surface changes an angle of the joint surface to the reference surface when the partial spherical cover is rotated on the cover-support surface.

8. The housing for a dome camera according to claim 7, wherein the base comprises a cover rotating mechanism for rotating the dome cover independently of the turning of a camera.

9. The housing for a dome camera according to claim 7, wherein the tilt angle of the cover-support surface with respect to the reference surface and the tilt angle of the cover-supported surface with respect to the joint surface are set so as to be equal to each other.

10. The housing for a dome camera according to claim 7, wherein
    the base comprises:
    a fixed part having the reference surface; and
    a rotatable part having the cover-support surface and being rotatable with respect to the fixed part, and wherein the dome cover is rotatably supported on the rotatable part.

* * * * *